US010308200B2

(12) United States Patent
Ghannam et al.

(10) Patent No.: US 10,308,200 B2
(45) Date of Patent: Jun. 4, 2019

(54) METHOD AND APPARATUS FOR ATTACHING PUSH BARS

(71) Applicant: Ford Global Technologies, LLC, Dearborn, MI (US)

(72) Inventors: Mahmoud Yousef Ghannam, Canton, MI (US); Swadad A. Carremm, Canton, MI (US); John W. Jensen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/700,333

(22) Filed: Sep. 11, 2017

(65) Prior Publication Data

US 2019/0077347 A1    Mar. 14, 2019

(51) Int. Cl.
*B60R 19/26*      (2006.01)
*B60R 19/32*      (2006.01)
*B60R 19/52*      (2006.01)

(52) U.S. Cl.
CPC .............. *B60R 19/26* (2013.01); *B60R 19/32* (2013.01); *B60R 19/52* (2013.01); *B60R 2019/262* (2013.01); *B60R 2019/522* (2013.01)

(58) Field of Classification Search
CPC ......... B60R 19/26; B60R 19/52; B60R 19/32; B60R 2019/522; B60R 2019/262
USPC ........ 293/115, 134, 117, 118, 142, 5, 4, 108
See application file for complete search history.

(56) References Cited

U.S. PATENT DOCUMENTS

| | | | | |
|---|---|---|---|---|
| 3,947,061 A * | 3/1976 | Ellis | ........................ | B60R 19/40 293/5 |
| 5,011,205 A * | 4/1991 | Liu | ........................ | B60R 19/40 180/276 |
| 5,370,429 A * | 12/1994 | Reuber | ................... | B60R 19/40 188/289 |
| 5,460,421 A * | 10/1995 | Culbertson | ............. | B60R 19/36 188/377 |
| 6,224,120 B1 * | 5/2001 | Eipper | .................... | B60R 19/40 293/115 |
| 6,536,818 B1 * | 3/2003 | Moss | ...................... | B60R 19/26 293/102 |
| 6,709,035 B1 * | 3/2004 | Namuduri | ............... | B60R 19/40 293/118 |
| 6,976,718 B2 * | 12/2005 | Nakanishi | ............... | B60R 19/40 293/118 |
| 7,654,370 B2 | 2/2010 | Cubalchini, Jr. | | |

(Continued)

FOREIGN PATENT DOCUMENTS

DE      4337225 A1    3/1994
DE    19860249 C1    7/2000

(Continued)

*Primary Examiner* — Jason S Morrow
*Assistant Examiner* — E Turner Hicks
(74) *Attorney, Agent, or Firm* — Jason Rogers; Brooks Kushman P.C.

(57) ABSTRACT

A vehicle includes a body structure, a push bar, and a damper connecting the push bar to the body structure. The damper includes a base and a rod that are movable relative to each other. The rod is attached to one of the push bar and the body structure, and the base is attached to the other of the push bar and the body structure. The damper is controllable to adjust a damping ratio of the damper and/or adjust a resting position of the rod relative to the base to axially move the push bar.

20 Claims, 3 Drawing Sheets

(56) References Cited

U.S. PATENT DOCUMENTS

| | | | | |
|---|---|---|---|---|
| 7,909,373 B2* | 3/2011 | Donovan | ............... | B60R 19/40 |
| | | | | 293/118 |
| 2001/0015559 A1* | 8/2001 | Storer | ..................... | B60R 19/52 |
| | | | | 293/115 |
| 2002/0050723 A1* | 5/2002 | Wang | ..................... | B60R 19/40 |
| | | | | 293/132 |
| 2003/0034697 A1 | 2/2003 | Goldner et al. | | |
| 2009/0302623 A1* | 12/2009 | Finney | ................... | B60R 19/52 |
| | | | | 293/115 |

FOREIGN PATENT DOCUMENTS

| | | | |
|---|---|---|---|
| DE | 10002148 | A1 | 7/2001 |
| DE | 102013000459 | B3 | 7/2014 |
| EP | 1486381 | A2 | 12/2004 |

\* cited by examiner

METHOD AND APPARATUS FOR ATTACHING PUSH BARS

TECHNICAL FIELD

This disclosure relates to an attachment system for securing vehicle push bars to a front end of a vehicle.

BACKGROUND

Police interceptor vehicles and other emergency or special purpose vehicles are provided with push bars on the front end. Aftermarket push bars may have different designs and may be fabricated as a flat plate, a contoured plate, a tubular frame, etc. Push bars may be made of different materials such as steel, aluminum, polycarbonate, polyethylene, or the like. Grill guards, brush guards, and other features and options may be incorporated in a push bar. Push bars come in different sizes and must be able to be attached to different types of vehicles.

SUMMARY

According to one embodiment, a vehicle includes a body structure, a push bar, and a damper having a base and a rod movable relative to each other. The damper is interposed between the body structure and the push bar with the rod attached to one of the push bar and the body structure, and the base attached to the other of the push bar and the body structure. The damper is controllable, in response to a pushing mode being requested, to increase a damping ratio of the damper and increase a resting position of the rod relative to the base to axially move the push bar away from the body structure.

According to another embodiment, a vehicle includes a body structure, a push bar, and a damper connecting the push bar to the body structure and having a selectable damping ratio. A controller of the vehicle is configured to, in response to a collision being detected, set the damping ratio to a first magnitude, and, in response to a request for pushing mode, set the damping ratio to a second magnitude that is greater than the first magnitude.

According to yet another embodiment, a vehicle includes a body structure having a front bumper beam supporting a bumper shell that defines at least a portion of a front fascia of the vehicle. A push bar is supported in front of the front facia. A pair of dampers are laterally spaced from each other and connect the push bar to the bumper beam. A controller is configured to default a damping ratio of each of the dampers to a first magnitude and, in response to a request for pushing mode, set the damping ratio of each of the dampers to a second magnitude that is greater than the first magnitude.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
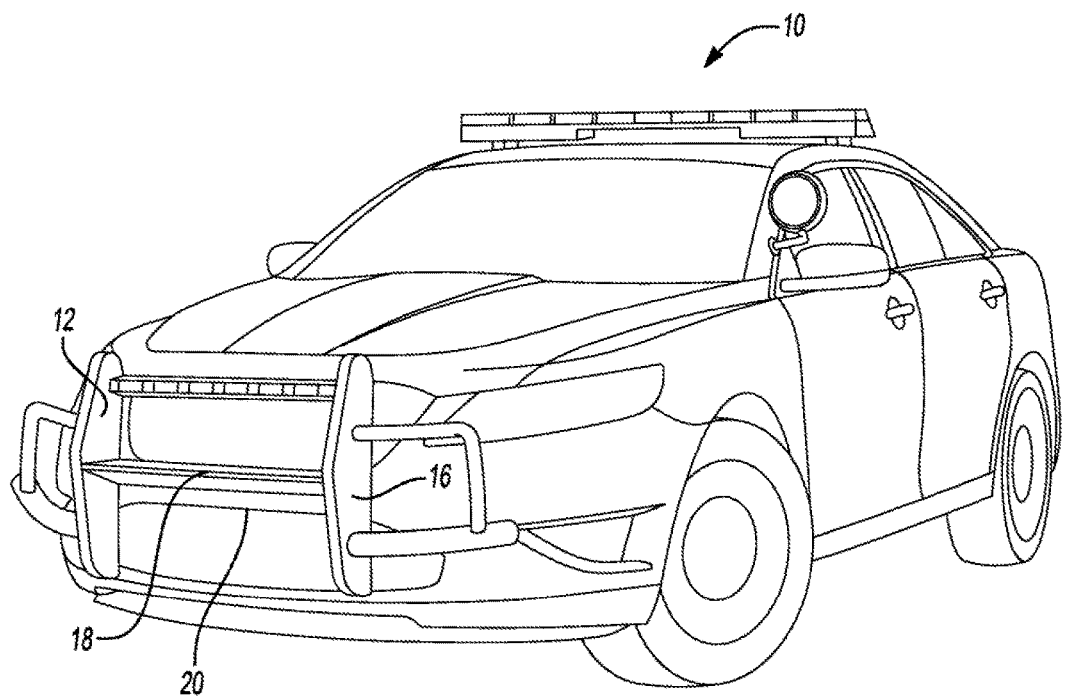
FIG. 1 is a front perspective view of a police interceptor vehicle provided with a push bar in front of the front bumper.

Referring to FIG. 1, a vehicle 10, such as a police interceptor car, is shown with a push-bar assembly generally indicated by reference numeral 12. The push-bar assembly 12 includes a pair of push-bar supports 16 and grill-guard bars 18 that extend between the supports 16. The push-bar assembly 12 (hereinafter referred to as push bar) is attached to the vehicle 10 in front of the front fascia 20. The push bar 12 enables the vehicle 10 to push or collide with other vehicles without damaging the front fascia 20.

Vehicle manufacturers test, calibrate, and tune components of the vehicle front end to achieve desired characteristics during a collision. Push bars are typically aftermarket components attached to the vehicle body structure or chassis by an end user, and vehicle manufacturers typically have no control over the design of these push bars. The push bars modify the collision characteristics of the front end, and a vehicle equipped with a push bar may not perform as well as the original vehicle during a collision. For example, vehicles typically include energy absorbing structures such as the bumper shell, crush cans, and other energy absorbing materials. Push bars were traditionally attached rigidly to the vehicle frame. Thus, the energy absorbing structures are bypassed during a collision. The following figures and related text disclose a push-bar attachment system that reduces the compromising effects associated with push bars.

Figure 2:
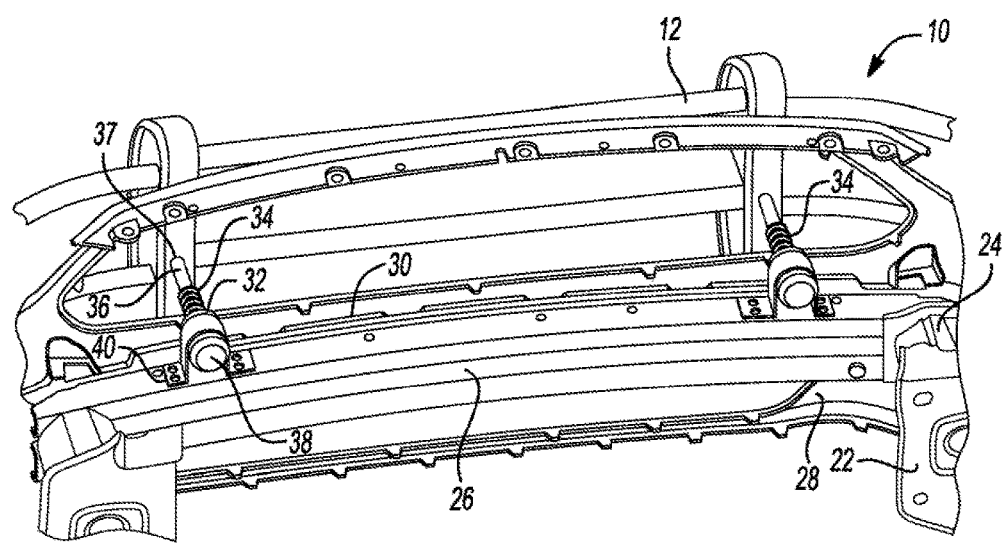
FIG. 2 is a fragmentary perspective view of a vehicle with a push bar including a set of dampers for attaching the push bar to the vehicle.

Referring to FIG. 2, the vehicle 10 has a body structure or chassis generally denoted by reference numeral 22. The body structure 22 includes longitudinal frame rails (not shown) and a pair of crush cans 24 that are attached to front portions of the frame rails. A bumper beam 26 extends across the front portion of the vehicle and is connected to each of the crush cans 24. A bumper shell 28 is supported by the bumper beam 26 and forms a portion of the front fascia 20. An energy absorbing structure 30 may be disposed between the bumper shell 28 and the bumper beam 26.

The push bar 12 is supported in front of the front fascia 20 by an attachment system 32. Rather than rigidly attaching the push bar 12 to the body structure 22, as traditionally done, the attachment system 32 includes at least a pair of dampers 34 that secure the push bar 12 to the body structure 22. The attachment system 32 may also include secondary attachments (not shown) that supplement the dampers 34. The dampers 34 allow the push bar 12 to move in a longitudinal direction of the vehicle. This movement may be in response to intentional adjustment of the damper or in response to a force compressing the dampers.

Each damper 34 may include a base 38 (sometimes called a cylinder) and a rod 36 (sometime called a piston) that is telescopically movable relative to the base 38. In the illustrated embodiment, the base 38 is attached to the bumper beam 26 by a bracket 40, and an end 37 of the rod 36 is attached to the push bar 12. In other embodiments, the orientation of the damper 34 is reversed with the base 38 attached to the push bar 12 and the rod 36 attached to the bumper beam 26. The damper 34 may have a variable damping ratio (stiffness) that can be adjusted to increase or decrease the damping ratio depending upon operating conditions. The damper 34 may also be configured to have an adjustable resting position for the rod 36. The resting position of the rod 36 is the position of the rod relative to the base 38, e.g., the distance of end 37 from the base 38, when forces are not acting on the damper 34. Several types of dampers have the above described capabilities. For example, the damper 34 may be an electromechanical damper or a pneumatic damper. Depending upon the type of damper used, a mechanical spring (not shown) may encircle the rod 36 between the end 37 and the base 38.

One type of electromechanical damper includes a magnetorheological system in which the base of the damper is filled with a magnetorheological fluid, which typically includes oil and magnetized iron particles. One or more electromagnetic coils are disposed in the base or on a portion of the piston rod disposed in the base. When energized, the electromagnetic coils excite the iron particles to increase the viscosity of the fluid and stiffen the damper. The damping ratio of the damper can be adjusted by altering an amount of current or voltage sent to the coils.

Another type of electromechanical damper includes a linear tubular permanent magnet actuator. US Patent Publication 2003/0034697 (Ser. No. 09/850,412) filed on May 7, 2001 is an example of this type of electromechanical damper, and the contents of which are incorporated in their entirety by reference herein.

One type of pneumatic damper includes an air bellow and a rod connected to the air bellow. The pneumatic dampers are connected to an air system that includes a compressor, a tank, air lines, and other components. The air system supplies air to the air bellow. The damping ratio of the damper, as well as the resting position of the rod, can be adjusted by increasing or decreasing the air pressure within the air bellow.

Figure 3:
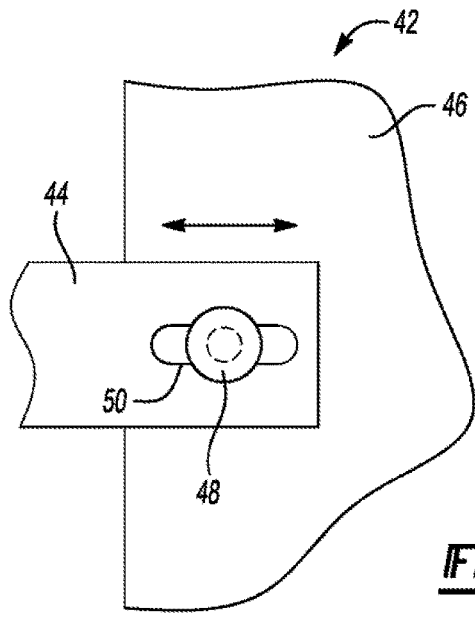
FIG. 3 illustrates a secondary attachment of the push bar.

Referring to FIG. 3, the push bar 12 may be further attached to the vehicle by one or more secondary attachments 42. The secondary attachments 42 may be designed to support the weight of the push bar 12 to reduce moment at the dampers 34, and to allow the push bar 12 to freely move in the longitudinal direction of the vehicle. Each secondary attachment 42 may include a first portion that is slidable relative to a second portion in the longitudinal direction of the vehicle. For example, a planar portion 44 of the secondary attachment 42 is slidably connected to a component 46 of the body structure 22. The planar portion 44 defines a slot 50 elongated in the longitudinal direction of the vehicle. A pin 48 is disposed within the slot 50 and fixed to the component 46. The pin 48 is movable within the slot 50 allowing the push bar 12 to more fore and aft.

A problem with rigidly attaching push bars is that many of the energy absorbing structures are bypassed due to the push bar being directly connected to the body structure. This alters the collision characteristics of the vehicle. The dampers 34 are compressible during a collision allowing the push bar 12 to be driven into the front fascia 20. Thus, the front fascia 20 still receives impact energy during a collision. Since the front fascia 20 receives impact, the energy absorbing structures, e.g., bumper shell 28 and crush cans 24, absorb impact energy during the collision similar to vehicles without push bars. By employing the attachment system 32, all of the benefits of push bars can be realized without negatively affecting the collision characteristics of the vehicle.

Figure 4:
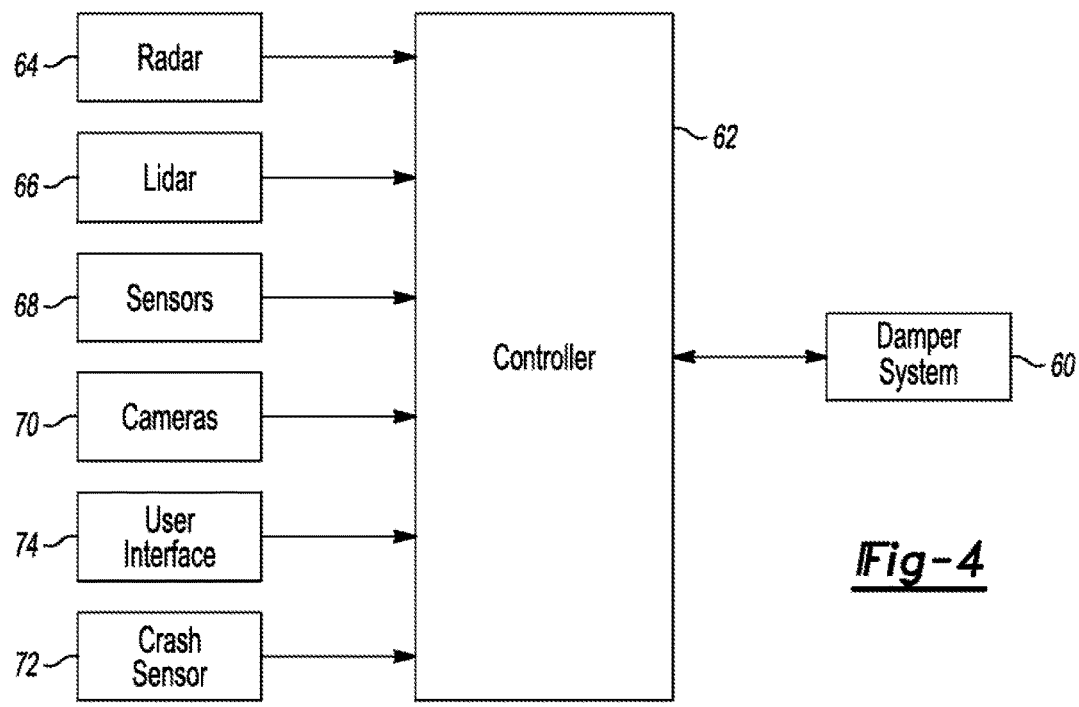
FIG. 4 is a diagram of a control system for the push bar.

Referring to FIG. 4, the actuatable dampers 34 of the damper system 60 enable the push bar 12 to have multiple modes such as default mode, pushing mode, and collision mode. The damper system 60 may be controlled by a vehicle controller 62. While illustrated as one controller, the controller 62 may be part of a larger control system and may be controlled by various other controllers throughout the vehicle 10, such as a vehicle system controller (VSC). It is to be understood that the controller 62 and one or more other controllers can collectively be referred to as a "controller" that controls various actuators in response to signals from various sensors to control functions such as operating the damper system 60. Any reference in the claims to "a controller" refers to one or more controllers. The controller 62 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 62 communicates with various sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

Control logic or functions performed by controller 62 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 62. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The various modes may be engaged automatically by the controller 62, manually by a vehicle occupant, or by a combination of both. For example, pushing mode may be engaged by either the controller 62 or the occupant, and collision mode may only be engageable by the controller 62. The vehicle 10 may include systems for detecting conditions surrounding the vehicle such as Radar 70, Lidar 66, ultrasonic sensors 68, cameras 70, and the like. The vehicle 10 may also include a crash sensor 72, e.g., an accelerometer configured to measure a deceleration rate of the vehicle. These systems and sensors are in electrical communication with the controller 62 and can be used as inputs for automatically controlling the damper system 60. The controller 62 may include one or more algorithms configured to command the damper system 60 to an appropriate mode based on inputs from at least these systems and sensors.

The vehicle 10 may include a user interface 74—such as a touchscreen, or one or more buttons, toggles or switches—that enables an occupant of the vehicle 10 to manually select a mode of the damper system 60. For example, an occupant may place the damper system 60 in pushing mode via the user interface.

Depending upon the embodiment, the damping ratio and/or the resting position of the dampers 34 may be different in each of the modes. In pushing mode, the dampers 34 may be set to their forward-most resting position and to their highest damping ratio. Setting the dampers 34 to their forward-most resting position places the push bar 12 furthest in front of the front fascia 20 preventing the pushed object, e.g., a vehicle, from damaging the front fascia 20. Setting the dampers 34 to the stiffest setting increases the rigidity of the push bar 12, which increases control during the pushing and prevents that the push bar 12 from being driven into the front fascia 20.

During a collision, it may be advantageous to reduce the damping ratio allowing the push bar 12 to be compressed into the front facia 20 so that the energy absorption systems of the front end are utilized. The damping ratio chosen for collision mode may be set so that dampers 34 absorb impact energy without permitting the push bar 12 to contact the front fascia 24 in collisions of lesser magnitude and to permit compression of the dampers 34 allowing the push bar 12 to contact the front facia in collisions of greater magnitude. The specific damping ratio is based on characteristics of the vehicle, and may vary across different vehicle models.

In default mode, the damping ratio may be set between that of pushing mode and collision mode. The resting position of the dampers 34 may be set to the most-extended position to protect the front facia 20, may be set to a retracted position to improve vehicle aerodynamics, or at some intermediate position therebetween. In embodiments where the push bar 12 is retracted in the default mode, the controller 62 may be programmed to extend the resting position of the dampers 34 in collision mode to prevent the push bar 12 from contacting the front facia 20 during impacts of lesser magnitude. Some embodiments may only include two modes, a collision mode, and a default mode that is similar to the above described pushing mode.

Figure 5:
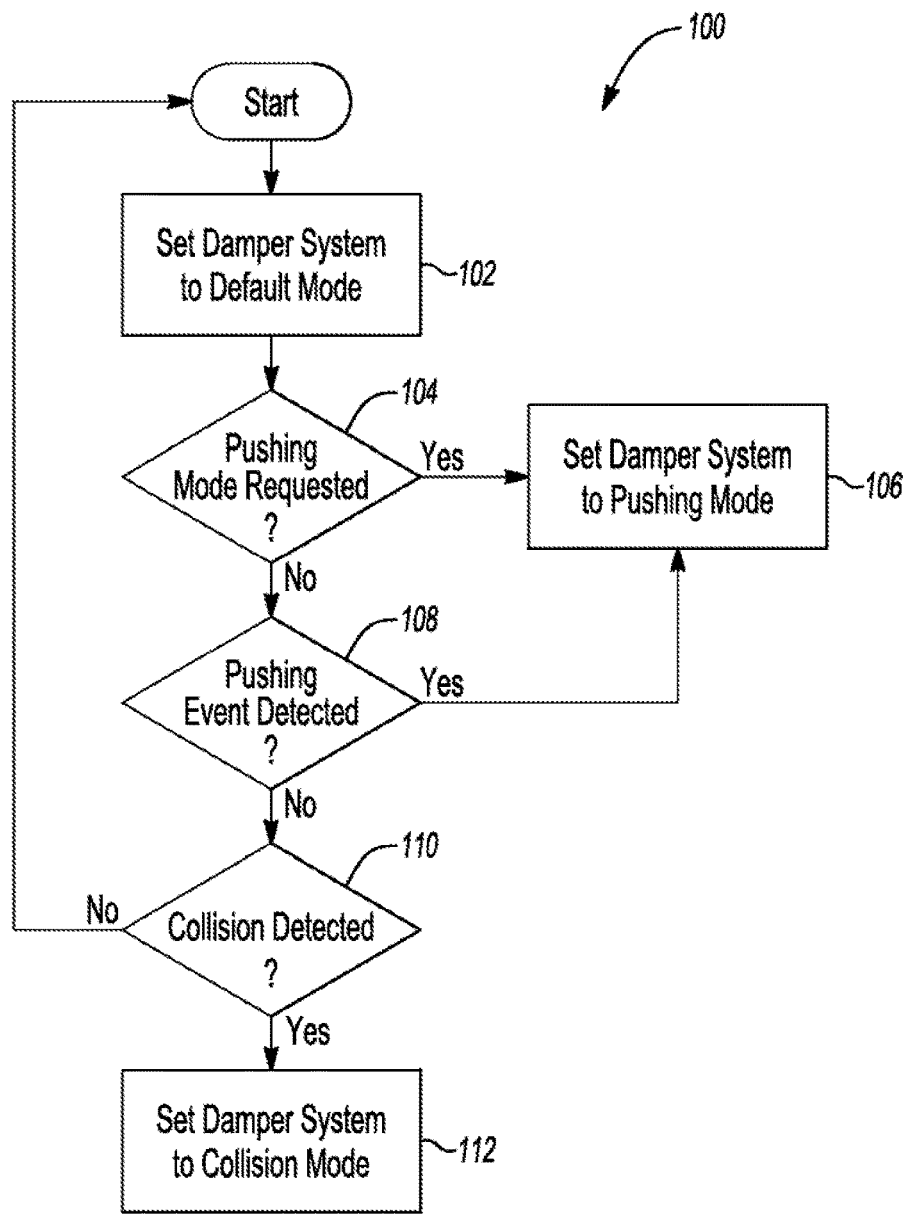
FIG. 5 is a flow chart illustrating an algorithm for controlling the push bar.

FIG. 5 is a flowchart 100 of an algorithm for controlling the damper system 60 according to one embodiment. The control logic 100 starts when the vehicle is started and sets the damper system to default mode at operation 102. At operation 104 the controller determines if pushing mode is being requested by a vehicle occupant. The occupant may request pushing mode via the user interface. The user interface may include a button or capacitive touch that allows the occupant to select pushing mode. The user interface is in communication with the controller. The controller is configured to, in response to the controller receiving a signal from the user interface, command the damper system to pushing mode at operation 106. The command may include one or more instructions that set the damping ratio and/or the damper resting position. The specific instructions of the command will vary depending upon the type of damper system being utilized. For example, if the dampers are electromagnetic dampers, the controller may command a specific current and/or voltage to the coils of the dampers to achieve the desired damping ratio and/or resting positon. If the dampers are pneumatic, the controller may command a desired air pressure to the air bellows to achieve the desired damping ratio/resting position. In one embodiment, the damping ratio in pushing mode is greater than in default mode. Thus, the controller may set a further extended damping ratio for the dampers when entering pushing mode. The resting position of the dampers may be more extended in pushing mode than in default mode. Thus, the controller may set an increased resting position for the dampers when entering pushing mode.

The pushing mode may be ended manually by the occupant via the user interface or automatically by the controller. As stated above, the vehicle includes a plurality of systems and sensors configured to sense conditions around the vehicle. These systems and sensors may be used to determine that a pushing event has ended. If the vehicle determines that no objects are proximate to the front of the vehicle, then the controller may automatically end pushing mode and return the damper system to default mode.

If pushing mode is not requested, control passes to operation 108 and the controller determines if a pushing event is being detected at operation 108. The controller is able to determine conditions in front of the vehicle via the detection systems such as the Radar, the Lidar, the sensors, and the camera. A push event may be triggered in response to an object being sensed in a path of the vehicle and the vehicle traveling below a threshold speed, e.g., 2 miles per hour. If the pushing event is detected at operation 108, control passes to operation 106 and the damper system is set to pushing mode.

If no at operation 108, control passes to operation 110 and the controller determines if a collision is detected. A collision may be detected using the detection systems such as the Radar, the Lidar, the sensors, and the camera as well as the crash sensor. If a collision is detected at operation 110, control passes to operation 112 and the controller commands the damper system to collision mode.

The command may include one or more instructions that set the damping ratio and/or the damper resting position. The specific instructions of the command will vary depending upon the type of damper system being utilized. For example, if the dampers are electromagnetic, the controller may command a specific current and/or voltage to the coils of the dampers to achieve the desired damping ratio and/or resting positon. If the dampers are pneumatic, the controller may command a desired air pressure to the air bellows to achieve the desired damping ratio/resting position. In one embodiment, the damping ratio in collision mode is less than in default mode. Thus, the controller will set a reduced damping ratio for the dampers when entering collision mode.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
   a body structure;
   a push bar; and
   a damper including a base and a rod movable relative to each other, the damper being interposed between the body structure and the push bar with the rod attached to one of the push bar and the body structure and the base attached to the other of the push bar and the body structure, wherein the damper has a variable damping ratio, and is controllable, in response to a pushing mode being requested, to increase the damping ratio of the damper and increase a resting position of the rod relative to the base to axially move the push bar away from the body structure.

2. The vehicle of claim 1, wherein the rod is attached to the push bar and the base is attached to the body structure.

3. The vehicle of claim 1, wherein the body structure includes a bumper beam, and the damper is mounted to the bumper beam.

4. The vehicle of claim 1 further comprising a second damper including a base and a rod movable relative to each other, the second damper being interposed between the body structure and the push bar with the rod attached to one of the push bar and the body structure, and the base attached to the other of the push bar and the body structure.

5. The vehicle of claim 1, wherein the damper is electromechanical.

6. The vehicle of claim 1, wherein the damper is pneumatic.

7. The vehicle of claim 1 further comprising a secondary attachment connecting the push bar to the body structure.

8. The vehicle of claim 7, wherein the secondary attachment includes a first portion and a second portion that are slidable relative to each other.

9. A vehicle comprising:
   a body structure;
   a push bar;
   a damper connecting the push bar to the body structure and having a selectable damping ratio; and
   a controller configured to
      in response to a collision being detected, set the damping ratio to a first magnitude, and
      in response to a request for pushing mode, set the damping ratio to a second magnitude that is greater than the first magnitude.

10. The vehicle of claim 9, wherein the damper is electromechanical or pneumatic.

11. The vehicle of claim 9, wherein the vehicle further comprises a user input in electrical communication with the controller and configured to generate a pushing-mode request signal for the controller, and wherein the controller is programmed to activate pushing mode in response to receiving the pushing-mode request signal.

12. The vehicle of claim 9, wherein the damper includes a base and a rod axially movable relative to the base, and the rod is connected to the push bar and the base is connected to the body structure.

13. The vehicle of claim 12, wherein a resting position of the rod relative the base is adjustable, and the controller is further configured to actuate the rod between different resting positions based on operating conditions of the vehicle.

14. The vehicle of claim 13, wherein the controller is further programmed to set the resting position to a most-extended position in response to a request for the pushing mode.

15. The vehicle of claim 14, wherein the controller is further programmed to, in response to a request for default mode, set the damping ratio to a third magnitude that is greater than the first magnitude and less than the second magnitude.

16. The vehicle of claim 9, wherein the body structure includes a bumper beam and the damper is connected to the bumper beam.

17. A vehicle comprising:
   a body structure including a front bumper beam supporting a bumper shell that defines at least a portion of a front fascia of the vehicle;
   a push bar supported in front of the front facia;
   a pair of dampers laterally spaced from each other and connecting the push bar to the bumper beam; and
   a controller configured to default a damping ratio of each of the dampers to a first magnitude and, in response to a request for pushing mode, set the damping ratio of each of the dampers to a second magnitude that is greater than the first magnitude.

18. The vehicle of claim 17, wherein each of the dampers includes a rod attached to the push bar and a base attached to the bumper beam.

19. The vehicle of claim 17, wherein the dampers are electromechanical.

20. The vehicle of claim 17, wherein the controller is further configured to, in response to a collision being detected, set the damping ratio to a third magnitude that is less than the second magnitude.

* * * * *